United States Patent [19]
Tsuruta et al.

[11] Patent Number: 5,876,527
[45] Date of Patent: Mar. 2, 1999

[54] PNEUMATIC RADIAL TIRES WITH RUBBER FILLER COMPOSED OF THREE RUBBER STOCKS

[75] Inventors: Makoto Tsuruta; Hiroshi Nakamura, both of Kodaira, Japan

[73] Assignee: Bridgestone Corporation, Tokyo, Japan

[21] Appl. No.: 921,523

[22] Filed: Sep. 2, 1997

[30] Foreign Application Priority Data

Sep. 3, 1996 [JP] Japan .................................. 8-232947

[51] Int. Cl.⁶ .......................... B60C 15/06; B60C 15/00
[52] U.S. Cl. .......................... 152/541; 152/547; 152/564
[58] Field of Search ................... 152/541, 547, 152/539, 564

[56] References Cited

U.S. PATENT DOCUMENTS

| | | | |
|---|---|---|---|
| 5,056,575 | 10/1991 | Yamaguchi et al. | |
| 5,626,698 | 5/1997 | Tsuruda et al. | 152/541 |
| 5,669,994 | 9/1997 | Tsuruta . | |
| 5,725,702 | 3/1998 | Nakamura et al. | 152/541 |

FOREIGN PATENT DOCUMENTS

| | | |
|---|---|---|
| 0 206 679 | 12/1986 | European Pat. Off. |
| 0 698 512 A2 | 2/1996 | European Pat. Off. |
| 2 554 059 | 5/1985 | France . |
| 2 604 396 | 4/1988 | France . |
| 5124408 | 5/1993 | Japan ..................................... 152/541 |

OTHER PUBLICATIONS

European Search Report, dated Dec. 15, 1997.

*Primary Examiner*—Adrienne Johnstone
*Attorney, Agent, or Firm*—Sughrue, Mion, Zinn, Macpeak & Seas, PLLC

[57] ABSTRACT

A pneumatic radial tire comprises a tread portion, a pair of sidewall portions, a pair of bead portions, a carcass of at least one rubberized ply containing cords arranged in a radial direction and consisting of a main carcass body and a turnup portion. A belt is superimposed about a crown portion of the carcass, and a rubber filler is arranged between the main carcass body and the turnup portion above the bead core. The rubber filler is composed of three different rubber stocks, and a hardest rubber stock among these rubber stocks is arranged in at least an outer zone in the radial direction of the tire sandwiching a normal line drawn from the turnup end to the outer surface of the main carcass body at a cross section of the tire and perpendicular to the main carcass body. A rubber stock having a middle hardness is arranged between the outer surface of the main carcass body and the hardest rubber stock as a stress-mitigating rubber layer. A softest rubber stock is arranged along an inner surface of the turnup portion.

8 Claims, 7 Drawing Sheets

PNEUMATIC RADIAL TIRES WITH RUBBER FILLER COMPOSED OF THREE RUBBER STOCKS

BACKGROUND OF THE INVENTION

1. Field of the Invention

This invention relates to a pneumatic radial tire, and more particularly to a heavy duty pneumatic radial tire for use in so-called heavy vehicles such as middle-size or more truck and bus, industrial vehicle, construction vehicle and the like. Particularly, the invention relates to a pneumatic radial tire having a long service life and excellent bead portion durability without arranging an extra reinforcing member in a bard portion or a region from a bead portion to a sidewall portion and increasing the volume of the rubber filler in the bead portion.

2. Description of Related Art

In a radial tire running under a heavy load, the sidewall portion is largely bent, but also the bead portion existing outward from a flange of a rim in a radial direction of the tire falls down toward the outside of the tire (hereinafter referred to as tire outside simply) or causes so-called bead portion fall-down phenomenon. By such a phenomenon a large compression strain·stress is applied to a turnup end portion of a carcass existing in the bead portion or in the sidewall portion near to the bead portion.

Further, a large movement of members is produced in a region ranging from the bead portion to the sidewall portion located in correspondence to stepping-in zone and kicking-out zone in a ground contact area of a tread portion of the radial tire along peripheries of these portions. Also, a large torsional deformation is created in these portions when a certain slip angle is applied to the tire during the cornering of the vehicle and hence a large shearing strain stress based on these member movement and torsional deformation is applied to the turnup end portion.

Since the above large compression strain stress and shearing strain stress are repeatedly input to the turnup end portion during the running of the tire, fatigue of rubber proceeds and finally rubber cracking is created along the turnup end portion, which is liable to advance to a separation failure of the turnup end portion. Such a failure is a time-honored and new problem with respect to the pneumatic radial tire running under a heavy load. This new problem is brought up by a high requirement of weight reduction and cost reduction and a tendency of a low section profile having, for example, an aspect ratio of not more than 70%.

In order to solve the above separation failure, various countermeasures have been taken. Among them, a main part in a typical embodiment of the conventional countermeasure is shown in FIG. 7, in which a rubber filler 7 taperingly extending from a bead core 4 toward an end of a tread portion (not shown) is arranged between a main body 5a of a carcass and a turnup portion 5b thereof along an outer surface of the main body. It is divided into a hard rubber stock 7-1 located side the main body 5a and a soft rubber stock 7-3 located side the turnup portion 5b.

When the solution is not yet satisfied by the illustrated embodiment, it is attempted to take various countermeasures for the distribution of the hard rubber stock 7-1 and soft rubber stock 7-3. As shown in FIG. 7, for example, the section shape of the hard rubber stock 7-1 is thickened in the vicinity of a position opposite to an end of the turnup portion 5b, or the hard rubber stock 7-1 is selectively arranged in the vicinity of this position.

Although it is expected to considerably improve the separation failure of the end portion of the turnup 5b to thereby attain remarkable improvement of bead portion durability, it has actually been confirmed that satisfactory bead portion durability cannot be obtained by these countermeasures. A peeling failure between cord and coating rubber in the main body 5a of the carcass is caused as a negative compensation for the improvement of separation resistance in the end portion of the turnup 5b and such a peeling failure concentrates in a region located somewhat outward from a position opposite to the end of the turnup portion 5b in the radial direction of the tire. This failure is a quite inexperienced and novel form of trouble.

SUMMARY OF THE INVENTION

It is, therefore, an object of the invention to provide a pneumatic radial tire having a considerably improved durability as a whole of a bead portion by effectively preventing the occurrence of the newly found peeling failure between cord and coating rubber in a main body of a carcass while highly maintaining a separation resistance of a turnup portion, which is improved under a heavy load at great pains, even in came of tires having a low aspect ratio on the assumption that the weight and cost of the tire are reduced.

According to the invention, there is the provision of a pneumatic radial tire comprising a tread portion, a pair of sidewall portions extending from both ends of the tread portion, a pair of bead portions extending from the sidewall portions, a carcass extending between a pair of bead cores embedded in the bead portions to reinforce these portions and comprised of at least one rubberized ply containing cords arranged in a radial direction, in which the carcass consists of a main carcass body and a turnup portion wound around the bead core in each bead portion from inside toward outside, a belt superimposed about a crown portion of the carcass to reinforce the tread portion, and a rubber filler taperingly extending from the bead core in each bead portion between the main carcass body and the turnup portion along an outer surface of the main carcass body toward an end of the tread portion, wherein the rubber filler is composed of three rubber stocks having different JIS hardnesses, and a hardest rubber stock having a maximum hardness among these rubber stocks is arranged in at least an outer zone of both zones in the radial direction of the tire sandwiching a normal line drawn from the turnup end to the outer surface of the main carcass body at a cross section of the tire and perpindicular to the main carcass body, and a rubber stock having a hardness between maximum hardness and minimum hardness among these rubber stocks is arranged between the outer surface of the main carcass body and the hardest rubber stock as a stress-mitigating rubber layer, and a softest rubber stock having a minimum hardness among these rubber stocks is arranged along an inner surface of the turnup portion, and the hardness of the stress-mitigating rubber layer is equal to or lower than that of a coating rubber for the cords of the carcass.

Since it is assumed that the pneumatic radial tire is used under a heavy load, steel cords or aromatic polyamide fiber cords such as KEVLAR having a strength close thereto are adaptable as the cord used in the carcass. In case of the steel cord, it is sufficient to use one carcass ply, while in case of the aromatic polyamide fiber cord, one or more carcass plies are used. Considering the establishment of weight reduction and cost reduction, the use of steel cord widely used as a cord material in the tire is advantageous. In case of the steel cord, it is particularly necessary that the coating rubber has a modulus of elasticity close to a high modulus of steel cord as far as possible. That is, it is required that the difference of rigidity between the steel cord and the coating rubber is reduced as far as possible, whereby the low carcass rigidity inherent to the radial structure particularly developed in the sidewall portion is enhanced an far as possible and also the resistance to fatigue fracture in the coating rubber is improved.

For this purpose, according to the invention, the hardest rubber stock having the maximum hardness among the three rubber stocks constituting the rubber filler is arranged in at least an outer zone among both outer and inner zones sandwiching the normal line in the radial direction of the tire and side the main carcass body. of course, the hardest rubber stock may be arranged over a region ranging from the inner zone to the outer zone according to the usual manner. Further, the stress-mitigating rubber layer is arranged between the outer surface of the main carcass body and the hardest rubber stock. In this way, a greater part of a large stress applied by the hardest rubber stock to the coating rubber in the main carcass body under loading is absorbed by the stress-mitigating rubber layer having a hardness equal to or lower than that of the coating rubber to largely decrease shearing stress acting between the coating rubber and the cord, whereby the occurrence of the peeling failure therebetween can be prevented.

The reason why the hardness of the stress-mitigating rubber layer is higher than that of the softest rubber stock is due to the fact that if the hardness of the stress-mitigating rubber layer is low, deformation excessively concentrates in the stress-mitigating rubber layer under loading and rubber fatigue rapidly proceeds with the advance of the running to finally cause fatigue fracture of the stress-mitigating rubber layer itself. Further, if the hardness of the stress-mitigating rubber layer is higher than that of the coating rubber for the carcass cord, stress of the coating rubber is rather increased without stress mitigation. Moreover, the softest rubber stock is arranged along the inner surface of the turnup portion, which is effective to attain the stress mitigation at the turnup end and is required to hold an excellent separation resistance at this turnup end.

In order to sufficiently provide the stress-mitigating action as mentioned above, it is favorable that the JIS hardness of the stress-mitigating rubber layer is within a range of 55°–75°, preferably 62°–72°, and the thickness of the stress-mitigating rubber layer in a portion of the layer existing between two normal lines perpendicular to the main carcass body drawn from the turnup end of the carcass and an outer end of the hardest rubber stock in the radial direction to the outer surface of the main carcass body is within a range of 0.7–4.5 mm.

In order to adapt the function and effect of the stress-mitigating rubber layer to various tires and various use conditions, it is favorable that an outer end of the stress-mitigating rubber layer in the radial direction in located outside the outer end of the hardest rubber stock in the radial direction, and that an inner end of the stress-mitigating rubber layer in the radial direction is located at a position extending inward from the normal line passing through the turnup end of the carcass in the radial direction.

In order to sufficiently ensure the separation resistance at the turnup end, it is favorable that a ratio of thickness of the hardest rubber stock to total thickness of the rubber filler as measured at the normal line passing through the turnup end is within a range of 0.20–0.55. Further, it is favorable that the thickness of the hardest rubber stock on the normal line passing through the turnup end is thinner than the thickness of the hardest rubber stock on a straight line drawn in parallel to the normal line outward therefrom in the radial direction.

DESCRIPTION OF PREFERRED EMBODIMENTS

Figure 1:
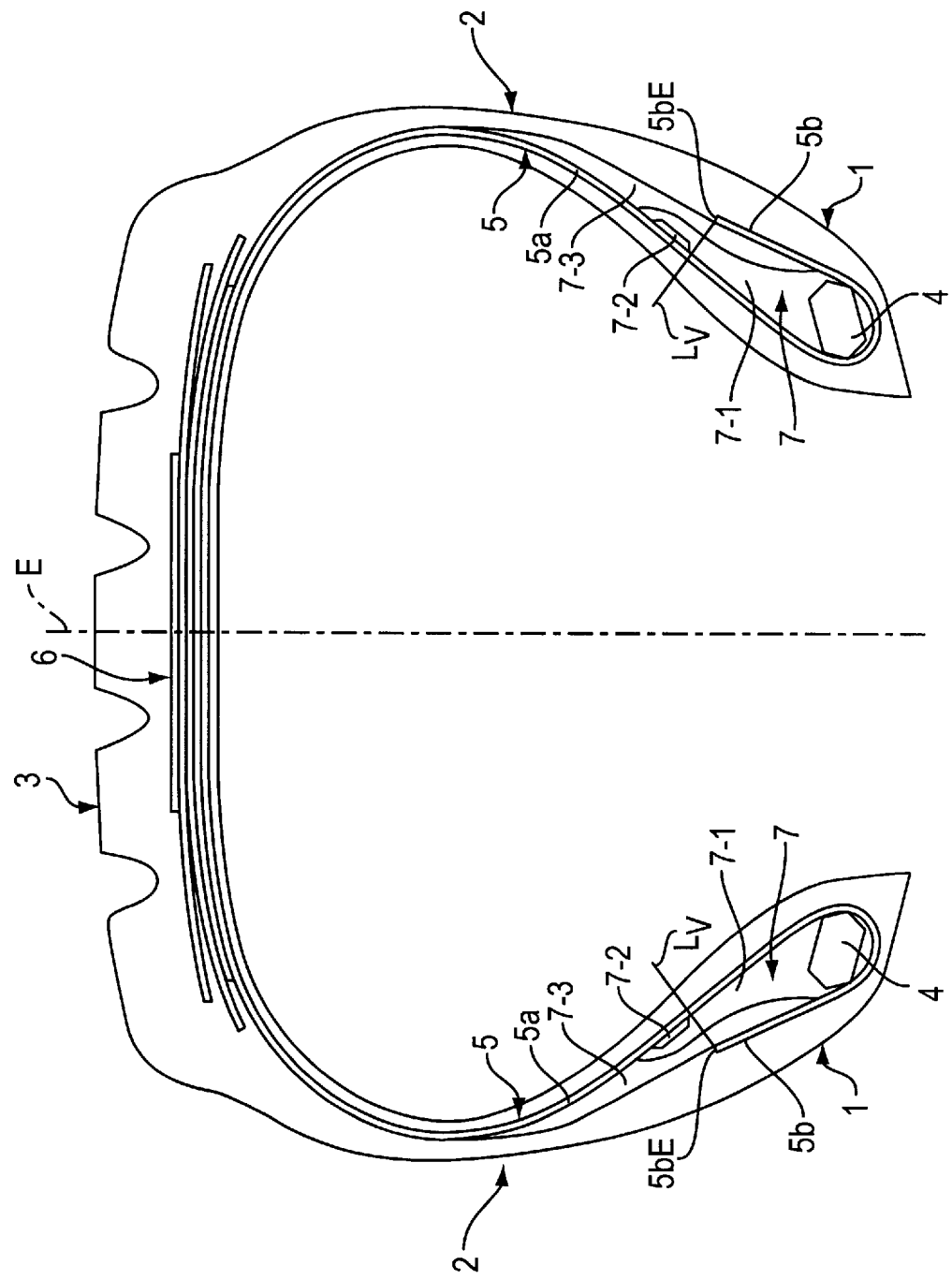
FIG. 1 is a diagrammatically section view of a first embodiment of the pneumatic radial tire according to the invention.

Various embodiments of the pneumatic radial tire according to the invention are shown in FIGS. 1–6, in which FIG. 1 is a radial section view in a plane including a rotating axis of the radial tire and FIGS. 2–6 are enlarged section views of main parts of the other embodiments of the radial tire having various rubber fillers, respectively.

The radial tire shown in FIG. 1 (tubeless tire in this embodiment) comprises a pair of bead portions 1, a pair of sidewall portions 2 and a tread portion 3, in which a carcass 5 of one or more plies (one ply in the illustrated embodiment) extends between a pair of bead cores 4 embedded in the bead portions 1 to reinforce the portions 1–3. The carcass 5 comprises a rubberized steel cord ply of a radial arrangement (steel cords are arranged at a cord angle of 80°–90° with respect to an equatorial plane E). A belt 6 of three or more steel cord layers (four belt layers in the illustrated embodiment) is superimposed about a crown portion of the carcass 5 to reinforce the tread portion 3.

Further, the carcass 5 consists of a main carcass body 5a reinforcing the portions 1–3 inside the tire and a turnup portion 5b reinforcing the bead portion 1 by winding about the bead core 4 from inside toward outside. further, the tire is provided with a rubber filler 7 taperingly extending from the bead core 4 between the main carcass body 5a and the turnup portion 5b along the outer surface of the main carcass body 5a toward an end of the tread portion 3.

The rubber filler 7 is comprised of three rubber stocks 7-1, 7-2, 7-3 having different JIS hardnesses (hereinafter referred to as hardness). Among these rubber stocks, a hardest rubber stock 7-1 having a maximum hardness is arranged in at least an outer zone on both inner and outer zones in the radial direction of the tire sandwiching a normal line Lv drawn from an end 5bE of the turnup portion 5b to the outer surface of the main carcass body 5a (In the illustrated embodiment, a small amount of the stock 7-1 is also arranged in the inner zone).

A rubber stock 7-2 has a hardness between maximum hardness and minimum hardness and is a layer-like and is arranged between the outer surface of the main carcass body 5a and the hardest rubber stock 7-1 as a stress-mitigating rubber layer. In this case, it is important that the rubber hardness of the stress-mitigating rubber layer 7-2 is lower than that of the coating rubber for the cord (steel cord) of the carcass 5 and in actually within a range of 55°–75°, preferably 62°–72°. Furthermore, a softest rubber stock 7-3 having a minimum hardness is arranged along an inner surface of the turnup portion 5b.

In the embodiment of FIG. 1, the stress-mitigating rubber layer 7-2 is selectively arranged outward from the normal line Lv in the radial direction and an outer end of the layer 7-2 in the radial direction is terminated inside an outer end of the hardest rubber stock 7-1 in the radial direction. Of course, the stress-mitigating rubber layer 7-2 is arranged in a region covering a zone of generating a maximum stress of the coating rubber in the tire of the illustrated embodiment.

The embodiments shown in FIGS. 2–6 are modification embodiments of three rubber stocks 7-1, 7-2, 7-3 in the rubber filler 7 shown in FIG. 1, so that the following will described with respect to only portions different from the case of FIG. 1.

Figure 2:
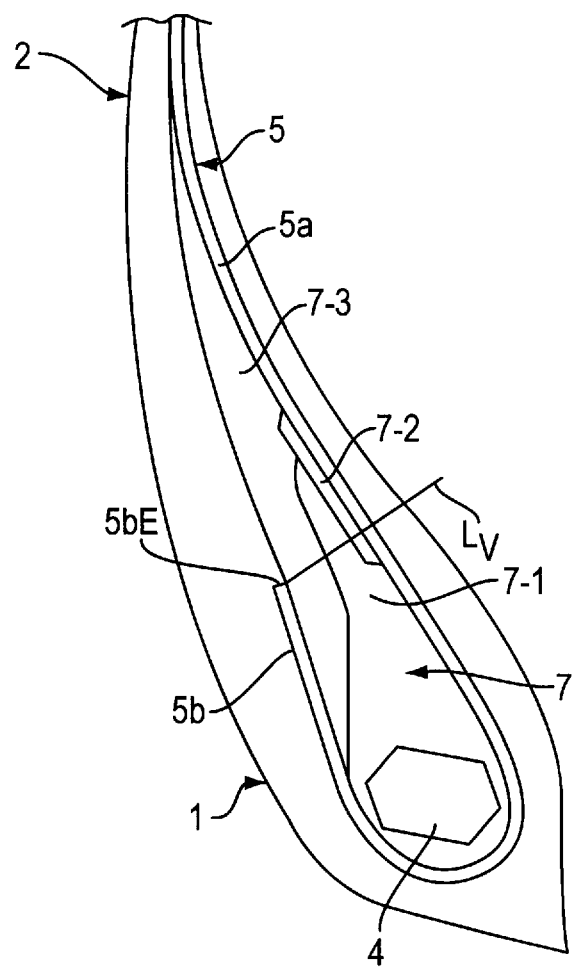
FIG. 2 is a diagrammatically section view of a main part of a second embodiment of the pneumatic radial tire according to the invention.
Figure 3:
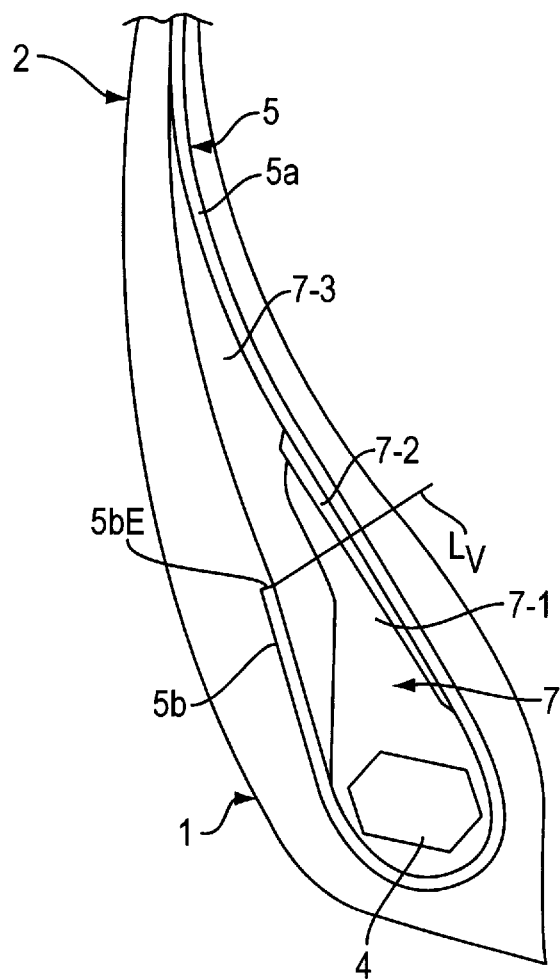
FIG. 3 is a diagrammatically section view of a main part of a third embodiment of the pneumatic radial tire according to the invention.

In the rubber filler 7 shown in FIGS. 2 and 3, the outer end of the stress-mitigating rubber layer 7-2 in the radial direction exceeds over the outer end of the hardest rubber stock 7-1 in the radial direction and further the inner end of the stress-mitigating rubber layer 7-2 in the radial direction is located inward from the normal line Lv in the radial direction. Particularly, a length of the inner end of the stress-mitigating rubber layer 7-2 in FIG. 3 over the normal line Lv is longer than a length of the case shown in FIG. 2.

Figure 4:
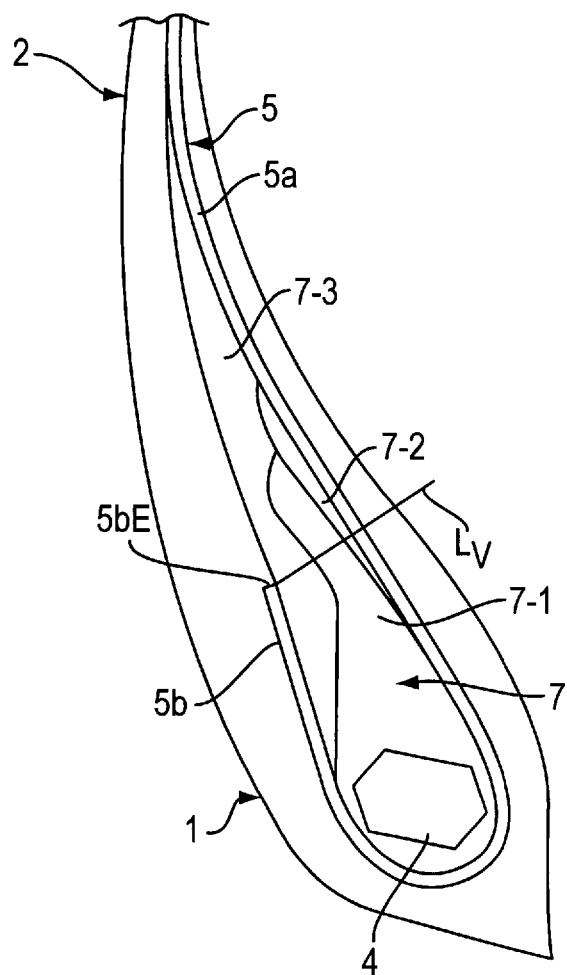
FIG. 4 is a diagrammatically section view of a main part of a fourth embodiment of the pneumatic radial tire according to the invention.

The arrangement of the stress-mitigating rubber layer 7-2 shown in FIG. 4 is substantially the same as in FIG. 3, but the sectional shape of the layer 7-2 is made thicker once and then taperingly extended over the normal line Lv inward in the radial direction, which is entirely different from the case of FIG. 3. In the embodiment of FIG. 4, the thickness of the hardest rubber stock 7-1 located outward from the normal line Lv in the radial direction is gradually increased without the rapid decrease to effectively improve the separation resistance at the end part of the turnup portion 5b, while the thickness of a portion of the layer 7-2 that is located near an outer position from the normal line Lv in the radial direction causing a large stress in the coating rubber of the carcass cord is increased to enhance the stress-mitigating effect.

Figure 5:
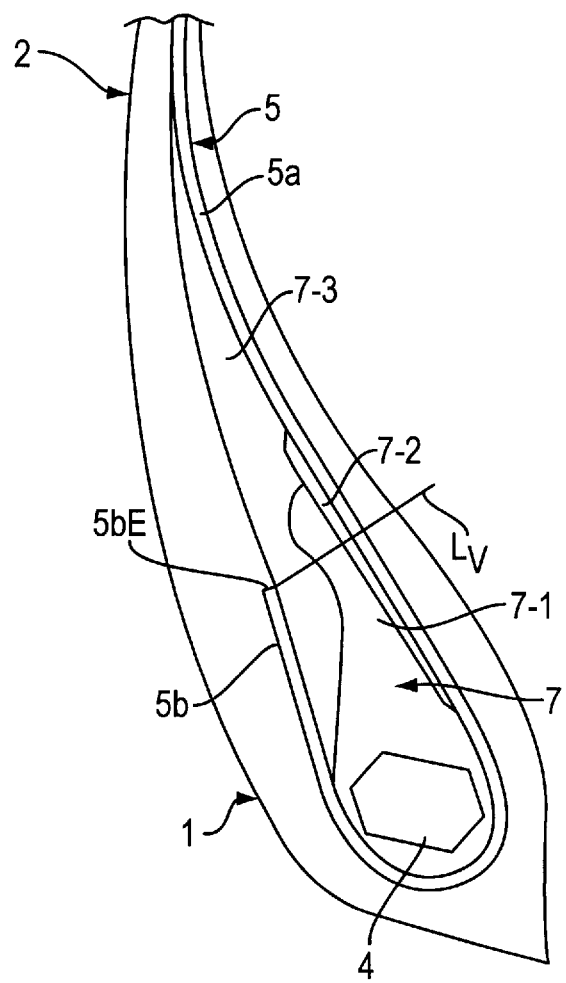
FIG. 5 is a diagrammatically section view of a main part of a fifth embodiment of the pneumatic radial tire according to the invention.

In the embodiment of FIG. 5, the thickness of the hardest rubber stock 7-1 located outward from the normal line Lv, concretely the thickness of the hardest rubber stock 7-1 on a straight line (not shown) drawn in parallel to the normal line Lv outward therefrom in the radial direction is thicker than the thickness of the rubber stock 7-1 on the normal line Lv to considerably expand a portion of the rubber stock 7-1 existing outward from the normal line Lv in the radial direction. Thus, the prevention of separation at the end part of the turnup portion 5b, which should be importantly considered in accordance with the kind of the tire and the use conditions, can simultaneously be established with the prevention of peeling the coating rubber from the cords in the main carcass body 5a.

Figure 6:
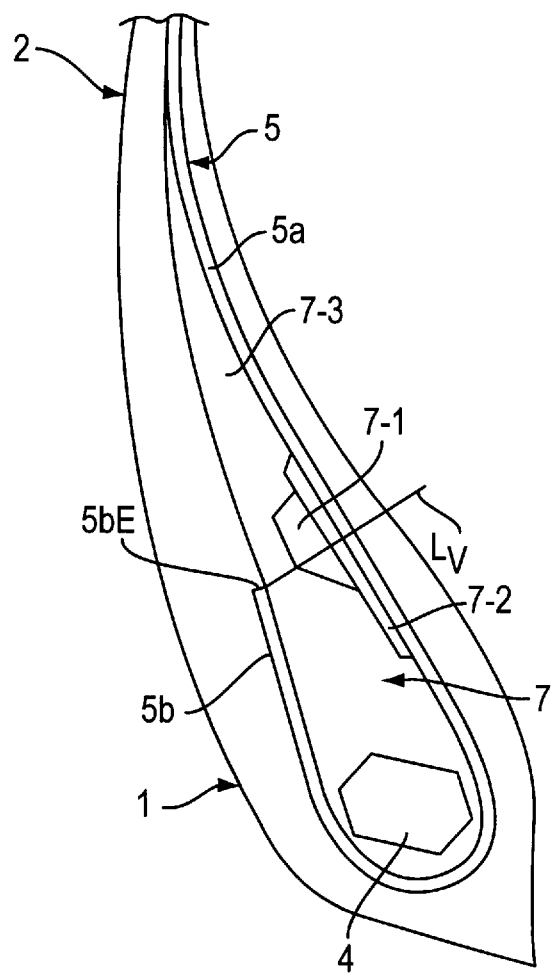
FIG. 6 is a diagrammatically section view of a main part of a sixth embodiment of the pneumatic radial tire according to the invention.

In the embodiment of FIG. 6, the sectional shape and arrangement of the hardest rubber stock 7-1 considerably differ with those of the aforementioned embodiments. That is, the hardest rubber stock 7-1 is arranged in the rubber filler 7 as so-called floating island structure and has a maximum gauge at a position existing on the normal line Lv. This structure attaches importance to the improvement of the separation resistance at the turnup portion 5b, whereby the peeling failure of the coating rubber is avoided.

According to the invention, the thickness of the stress-mitigating rubber layer 7-2 is desirable to be within a range of 0.7–4.5 mm in a portion of the layer 7-2 existing between a normal line (not shown) drawn from an outer end of the hardest rubber stock 7-1 in the radial direction to the outer surface of the main carcass body 5a and the above normal line Lv with reference to FIGS. 1–6. When the thickness of the layer 7-2 is less than 0.7 mm, the effect of mitigating stress by the coating rubber is small and peeling of the coating rubber is prematurely caused as compared with the end part of the turnup portion 5b, while when it exceeds 4.5 mm, the thickness of the hardest rubber stock 7-1 required for controlling the torsional deformation of the end part of the turnup portion 5b can not be ensured. If the thickness of the stock 7-1 is sufficiently ensured, the thickness of the softest rubber stock 7-3 can not be ensured. In any case, the separation resistance at the end part of the turnup portion 5b is degraded.

When a ratio of thickness of the hardest rubber stock 7-1 to total thickness of the rubber filler 7 as measured on the normal line Lv is within a range of 0.20–0.55, it is possible to simultaneously ensure the separation resistance at the end part of the turnup portion 5b and the peeling resistance of the coating rubber to the cords in the main carcass body 5a at higher levels. When the thickness ratio is less than 0.20, the arrangement of the hardest rubber stock 7-1 becomes meaningless, and if it is intended to ensure such an arrangement at this ratio, the total thickness of the rubber filler should be made largely thick, which undesirably increases the weight but also largely increases a heat generation of the bead portion 1 to considerably degrade the durability of the bead portion 1. When it exceeds 0.55, the thickness of the softest rubber stock 7-3 is lacking at the end part of the turnup portion 5b and compression stress created in the end part is not sufficiently mitigated and hence the separation resistance is degraded.

The following examples are given in illustration of the invention and are not intended as limitations thereof.

There are provided 18 tires of Examples 1–15, Conventional Example and Comparative Examples 1–2 for truck and bus having a tire size of 11/70R22.5 and a basic structure shown in FIG. 1, in which the carcass 5 is one rubberized carcass ply of steel cords arranged in the radial direction and the belt 6 is comprised of four belt cross layers each containing steel cords therein. Then, the durability test of the bead portion 1 is carried out with respect to these tires.

As regards these tires, the hardness of the coating rubber in the carcass 5, hardnesses of hardest rubber stock 7-1, stress-mitigating rubber layer 7-2 and softest rubber stock 7-3 constituting the rubber filler 7, average thickness of the stress-mitigating rubber layer (i.e. average thickness of stress-mitigating rubber layer existing between normal line Lv and a straight line drawn in parallel to the normal line Lv passing through an outer end of the hardest rubber stock 7-1 in the radial direction) and ratio of thickness of the hardest rubber stock 7-1 to total thickness of the rubber filler 7 as measured on the normal line Lv are shown in Tables 1 and 2.

The test for the durability of the bead portion is carried out according to the following method.

Each of the above tires subjected to an internal pressure of 8.5 kgf/cm$^2$ in pushed and run on a drum of an indoor drum testing machine rotating at a speed of 60 km/h under a load of 5000 kg, during which a running distance till the occurrence of trouble in the bead portion is measured. In Tables 1 and 2, the running distance is represented by an index on the basis that the conventional example is 100 as a durability test result. The larger the index value, the better the durability. Further, the form of trouble in the bead portion is also shown in Tables 1 and 2.

been confirmed that the tire weight in these examples is somewhat lighter than that of the conventional example.

As mentioned above, according to the invention, the occurrence of the peeling failure between the cord and the coating rubber in the main carcass body is advantageously prevented under heavy load conditions while maintaining the weight reduction and cost reduction and hence the excellent separation resistance at the end part of the turnup

TABLE 1

Figure 7:
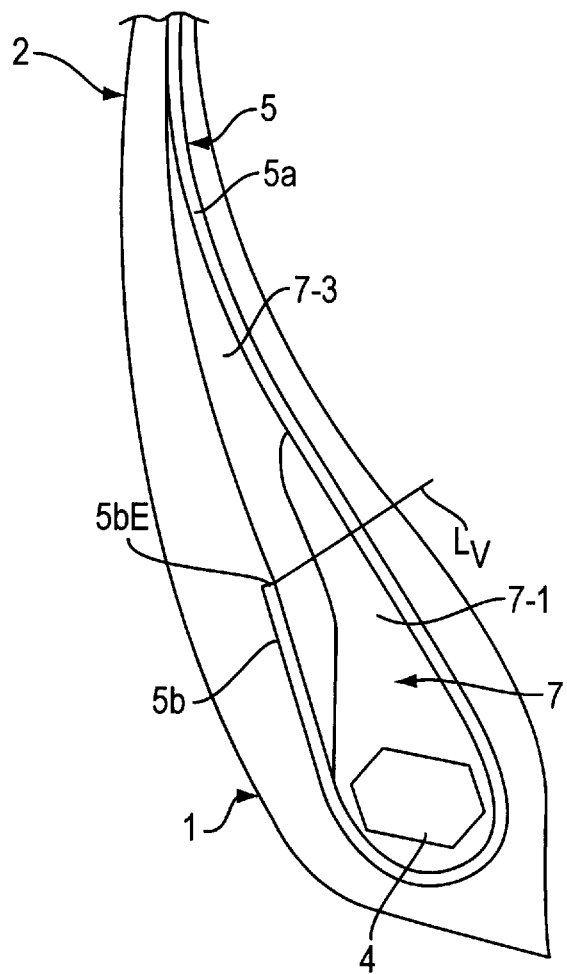
FIG. 7 is a diagrammatically section view of a main part of the conventional pneumatic radial tire.

| Items | Comparative Example | Examples | | | | | | | |
|---|---|---|---|---|---|---|---|---|---|
| | | 1 | 2 | 3 | 4 | 5 | 6 | 7 | 8 |
| Corresponding figure | FIG. 7 | FIG. 1 | FIG. 2 | FIG. 2 | FIG. 2 | FIG. 2 | FIG. 2 | FIG. 2 | FIG. 2 |
| Hardness of coating rubber | 76 | 76 | 76 | 76 | 76 | 76 | 76 | 76 | 76 |
| Hardness of hardest rubber stock | 83 | 83 | 83 | 83 | 83 | 83 | 83 | 83 | 83 |
| Hardness of stress-mitigating rubber layer | — | 55 | 65 | 75 | 65 | 65 | 65 | 65 | 65 |
| Hardness of softest rubber stock | 54 | 54 | 54 | 54 | 54 | 54 | 54 | 54 | 54 |
| Average thickness of stress-mitigating rubber layer (mm) | — | 1.5 | 1.5 | 1.5 | 0.7 | 1.0 | 4.0 | 4.5 | 1.5 |
| Ratio of thickness of hardest rubber stock (%) | 45 | 45 | 45 | 45 | 45 | 45 | 45 | 45 | 15 |
| Durability test result (index) | 100 | 121 | 128 | 122 | 108 | 121 | 122 | 108 | 110 |
| Trouble form | fracture of coating rubber | separation at turnup end | separation at turnup end | separation at turnup end | fracture of coating rubber | separation at turnup end | separation at turnup end | separation at turnup end | separation at turnup end |

TABLE 2

| Items | Examples | | | | | | | Comparative Example | |
|---|---|---|---|---|---|---|---|---|---|
| | 9 | 10 | 11 | 12 | 13 | 14 | 15 | 1 | 2 |
| Corresponding figure | FIG. 2 | FIG. 2 | FIG. 2 | FIG. 3 | FIG. 4 | FIG. 5 | FIG. 6 | FIG. 2 | FIG. 2 |
| Hardness of coating rubber | 76 | 76 | 76 | 76 | 76 | 76 | 76 | 76 | 76 |
| Hardness of hardest rubber stock | 83 | 83 | 83 | 83 | 83 | 83 | 83 | 83 | 83 |
| Hardness of stress-mitigating layer layer | 65 | 65 | 65 | 65 | 65 | 65 | 65 | 50 | 80 |
| Hardness of softest rubber stock | 54 | 54 | 54 | 54 | 54 | 54 | 54 | 54 | 54 |
| Average thickness of stress-mitigating rubber layer (mm) | 1.5 | 1.5 | 1.5 | 1.5 | 1.5 | 1.5 | 1.5 | 1.5 | 1.5 |
| Ratio of thickness of hardest rubber stock (%) | 20 | 55 | 60 | 45 | 45 | 45 | 45 | 45 | 45 |
| Durability test result (index) | 126 | 124 | 112 | 130 | 130 | 138 | 124 | 96 | 98 |
| Trouble form | separation at turnup end | separation at turnup end | separation at turnup end | separation at turnup end | separation at turnup end | separation at turnup end | separation at turnup end | fracture of stress-mitigating rubber layer | separation between stress-mitigating rubber layer and coating rubber |

As seen from the results of Tables 1 and 2, the bead portion durability in the tires of Examples 1–15 is considerably improved as compared with the conventional tire and the tires of Comparative Examples 1–2. Moreover, it has portion can profitably be utilized, whereby there can be provided pneumatic radial tires having a long service life and considerably improved durability as a whole of the bead portion.

What is claimed is:

1. A pneumatic radial tire comprising; a tread portion, a pair of sidewall portions extending from both ends of the tread portion, a pair of bead portions extending from the sidewall portions, a carcass extending between a pair of bead cores embedded in the bead portions to reinforce these portions and comprised of at least one rubberized ply containing cords arranged in a radial direction, in which the carcass consists of a main carcass body and a turnup portion wound around the bead core in each bead portion from inside toward outside, a belt superimposed about a crown portion of the carcass to reinforce the tread portion, and a rubber filler taperingly extending from the bead core in each bead portion between the main carcass body and the turnup portion along an outer surface of the main carcass body toward an end of the tread portion, wherein the rubber filler is composed of three rubber stocks having different JIS hardnesses, and a hardest rubber stock having a maximum hardness among these rubber stocks is arranged in at least an outer zone of both zones in the radial direction of the tire sandwiching a normal in drawn from the turnup end to the outer surface of the main carcass body at a cross section of the tire and perpendicular to the main carcass body, and a rubber stock having a hardness between maximum hardness and minimum hardness among these rubber stocks is arranged between the outer surface of the main carcass body and the hardest rubber stock as a stress-mitigating rubber layer, and a softest rubber stock having a minimum hardness among these rubber stocks is arranged along an inner surface of the turnup portion, and the hardness of the stress-mitigating rubber layer is equal to or lower than that of a coating rubber for the cords of the carcass.

2. A pneumatic radial tire according to claim 1, wherein the JIS hardness of the stress-mitigating rubber layer is within a range of 55°–75°

3. A pneumatic radial tire according to claim 2, wherein the JIS hardness is within a range of 62°–72°.

4. A pneumatic radial tire according to claim 1, wherein a thickness of the stress-mitigating rubber layer in a portion of the layer existing between two normal lines perpendicular to the main carcass body drawn from the turnup end of the carcass and an outer end of the hardest rubber stock in the radial direction to the outer surface of the main carcass body is within a range of 0.7–4.5 mm.

5. A pneumatic radial tire according to claim 1, wherein an outer end of the stress-mitigating rubber layer in the radial direction in located outside the outer end of the hardest rubber stock in the radial direction.

6. A pneumatic radial tire according to claim 1, wherein an inner end of the stress-mitigating rubber layer in the radial direction is located at a position extending inward from the normal line passing through the turnup end of the carcass in the radial direction.

7. A pneumatic radial tire according to claim 1, wherein a ratio of thickness of the hardest rubber stock to total thickness of the rubber filler as measured at the normal line passing through the turnup end is within a range of 0.20–0.55.

8. A pneumatic radial tire according to claim 1, wherein a thickness of the hardest rubber stock on the normal line passing through the turnup end is thinner than the thickness of the hardest rubber stock on a straight line drawn in parallel to the normal line outward therefrom in the radial direction.

* * * * *